(12) United States Patent
Yancey et al.

(10) Patent No.: US 6,608,900 B1
(45) Date of Patent: Aug. 19, 2003

(54) LOAD MANAGEMENT SYSTEM FOR AN ELECTRICAL DEVICE

(75) Inventors: Edwin Glenn Yancey, Burleson, TX (US); Leroy S. Baker, Colleyville, TX (US); William I. H. Chen, Bedford, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/164,495

(22) Filed: Oct. 1, 1998

(51) Int. Cl.[7] ............................................. H04M 19/00
(52) U.S. Cl. ............................ 379/413; 307/39; 307/41
(58) Field of Search ........................... 379/413, 399.01, 379/318, 322; 363/79

(56) References Cited

U.S. PATENT DOCUMENTS

| | | | | |
|---|---|---|---|---|
| 4,356,481 A | * | 10/1982 | Kuki | 340/636 |
| 4,785,229 A | * | 11/1988 | Edwards | 323/284 |
| 4,906,055 A | * | 3/1990 | Horiuchi | 327/77 |
| 4,926,068 A | * | 5/1990 | Fujita | 327/205 |
| 4,935,642 A | * | 6/1990 | Obelode et al. | 307/32 |
| 5,581,170 A | * | 12/1996 | Mammano et al. | 320/116 |
| 6,016,072 A | * | 1/2000 | Ternullo et al. | 323/284 |
| 6,104,759 A | * | 8/2000 | Carkner et al. | 307/31 |
| 6,191,505 B1 | * | 2/2001 | Matsuyama | 307/130 |

* cited by examiner

Primary Examiner—Forester W. Isen
Assistant Examiner—Daniel Swerdlow
(74) Attorney, Agent, or Firm—Jones Day (57) ABSTRACT

A load management system for monitoring the output from a power supply and managing the load on said power supply, said load management system comprising a hysteresis circuit for signaling a load element to stop drawing current when an output voltage at said output falls below a first threshold and for signaling said load element to resume drawing current when said output voltage rises above a second threshold, said hysteresis circuit comprising a first state sensing circuit having an input coupled to said output and for signaling whether said output voltage is greater than or less than said first voltage threshold, a second state sensing circuit having an input coupled to said output and for signaling whether said output voltage is greater than or less than a second voltage threshold, and a state transition circuit having a first input coupled to the output of said first state sensing circuit and a second input coupled to the output of said second state sensing circuit, said state transition circuit having an output for setting a first control signal to a first state when said output voltage falls below said first threshold and resetting said first control signal to a second state when said output voltage rises above said second threshold.

15 Claims, 4 Drawing Sheets

LOAD MANAGEMENT SYSTEM FOR AN ELECTRICAL DEVICE

BACKGROUND OF THE INVENTION

The present invention is directed toward the field of power management systems. In particular, a load management system is disclosed for use with remotely powered electronic or telecommunication devices. Remotely powered devices generally receive power from a power source located some distance away through high voltage powering wires. Power converters located within the remote device convert the high voltage received from the power source to lower voltage levels that are compatible with the electronics within the remote device. The load management system of the present invention manages the load on the power converters to insure their proper functioning.

Because of the resistance in the powering wires in a remotely powered system, the voltage that the power source is able to deliver ("load voltage") to the power converters is limited by the current required by the power converters ("load current"). That is, as the load current increases, the load voltage decreases. The power delivered to the power converters ("load power") will increase in response to increased load current demand until the load current reaches a threshold level. Once the load current reaches the threshold level, any further increases in the load current will actually result in a decrease of the deliverable load power due to power losses in the powering wires. If the load current increases further, a point may be reached in which the power required by the power converters exceeds the delivered load power. When this happens, the power converters will enter an unsustainable state and behave erratically. This can cause the remote device to behave erratically.

An exemplary remotely powered electronic device is an Optical Network Unit ("ONU"). An ONU is a device that is used as an interface between fiber optic telecommunication lines and traditional wires used to provide telecommunication services such as cable television and telephonic services to homes or other buildings. The ONU has a power supply that typically includes: (i) input protection and filter circuitry; (ii) energy storage circuitry, (iii) input voltage monitors and threshold circuitry, (iv) D.C. to D.C. power converters; (v) ringing generators; and (vi) alarm and digital interface circuitry.

At an installed ONU, the load current demand varies depending on the customers' telecommunication service usage. The powering system is engineered to provide adequate power to the ONU under expected peak load current demand conditions. But, there could be times when the power demand of the ONU could exceed the load power available to the ONU. If that occurs, power converters in the ONU may behave erratically.

To prevent the remote device from behaving erratically, many remote devices shut down when the power demands exceed the power available. In the case of an ONU, a complete shut down would result in a complete interruption of all telecommunication services and is a very drastic solution to the problem. It is, thus, desirable to provide a system for preventing erratic ONU behavior without completely shutting down all telecommunication services.

Therefore, there remains a need for a load management system that will protect against erratic behavior without shutting down all functions or services.

SUMMARY OF THE INVENTION

The present invention overcomes the problem noted above and satisfies the needs in this field for a load management system that protects against erratic power converter behavior. It is therefore an object of the load management system of the present invention to shed load, in a systematic manner, as the load demand approaches the maximum-available-power point so that erratic power behavior may be avoided. It is a further object to provide a power management system that shuts down preselected load elements when the delivered load voltage falls below certain threshold levels and turns on load elements that had been shut down when the delivered load voltage rises above other threshold levels.

The power management system of the present invention turns off preselected load elements in a sequenced manner to allow the delivered load voltage to recover from a low voltage level to a voltage level that will insure stable power converter operation without completely shutting down all of the power converters. The load management system provides control signals to turn off certain load elements when the delivered load voltage falls below certain threshold levels. The load management system, through the control signals, signals the load elements to resume operation after the delivered load voltage has risen above other threshold levels.

The load management system of the present invention includes sensing means for monitoring the delivered load voltage, means for causing specific load elements to shut off when the delivered load voltage drops below certain thresholds, and means for causing those load elements to reactivate when the delivered load voltage rises above other thresholds. In one embodiment the load management system includes a number of hysteresis circuits, each hysteresis circuit comprising a first state sensing circuit, a second state sensing circuit, and a state transition circuit. The state sensing circuits could comprise comparators and the state transition circuit could comprise digital logic and memory elements. The state sensing circuits sense when the output voltage reaches certain thresholds and communicates this to the state transition circuits which in turn cause specific load elements to turn on or off.

As will be appreciated, the invention is capable of other and different embodiments, and its several details are capable of modifications in various respect, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE PREFERRED EMBODIMENT

Figure 1:
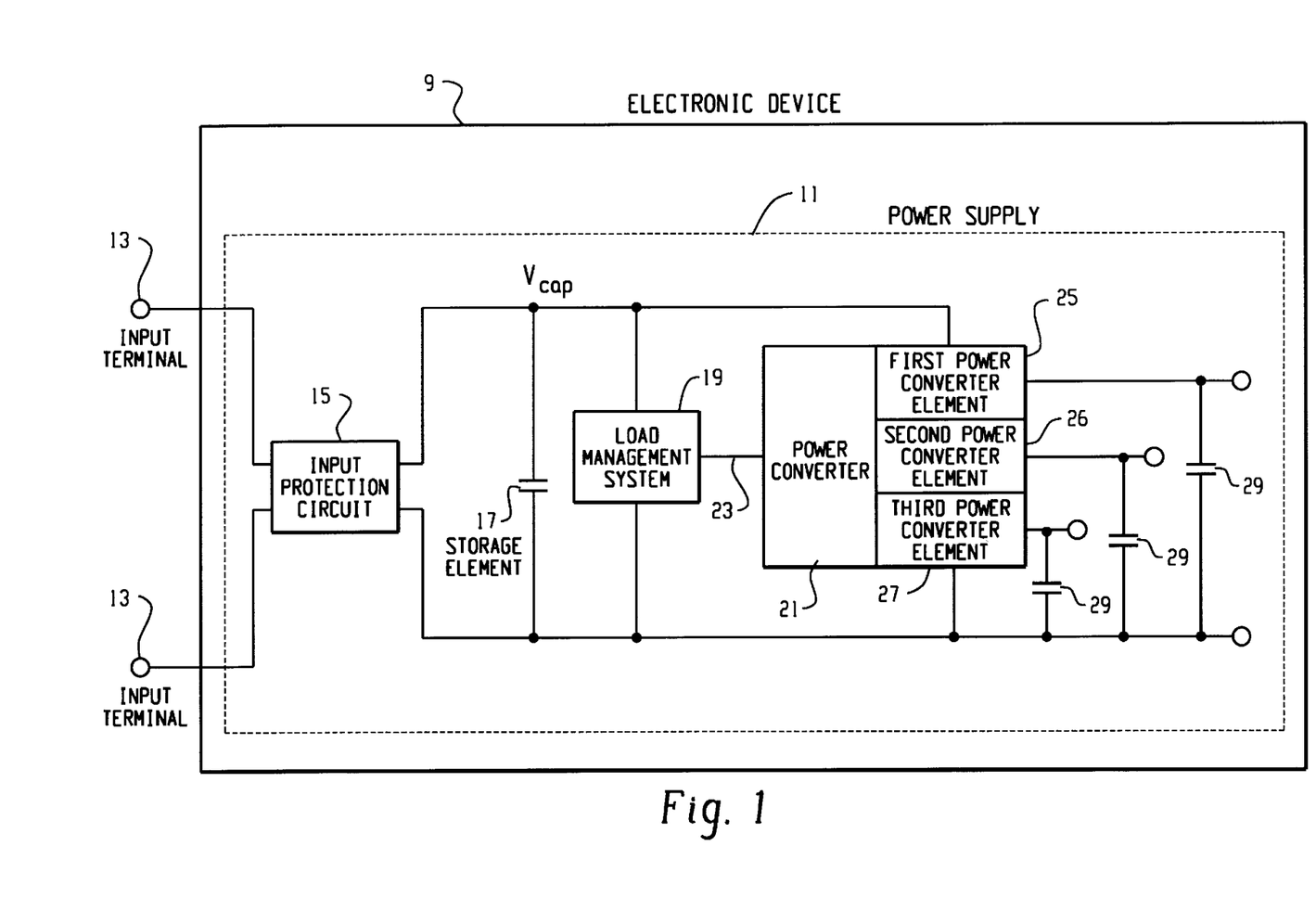
FIG. 1 is a block diagram of a preferred power supply.

Referring now to the drawings, FIG. 1 sets forth a block diagram of a typical power supply for a remote telecommunication device 9. In the embodiment illustrated, the device 9 is an ONU. The power supply 11 typically includes an input 13 for receiving input power from a high voltage source Vs (not shown) such as from the local utility company, an input protection circuit and filter 15, and storage elements 17 which store energy from the high voltage source in order to temporarily provide power indirectly to the device 9 during time periods when the current demands exceed the current available at input 13. Although the current supplying capacity at the high voltage source Vs may be quite large, the current available at the input 13 is limited in large part due to the resistance R in the wire pair (not shown) connecting the power supply 11 to the high voltage source Vs. The wire pair could be up to 6000 feet long. Thus, as the load current Iload increases, the load voltage Vload available at the input 13 decreases due to voltage drop in the wire pair:

$$Vload=Vs-R*Iload$$

The power available at the input 13 is:

$$Pload=Vload*Iload=Vs*Iload-R*Iload*Iload.$$

The delivered power Pload will increase as the load current Iload increases until the load current Iload=Vs/2R when the load voltage Vload=Vs/2. Any further increase in the load current Iload actually results in a decrease of the deliverable load power Pload.

Storage element 17 is provided to temporarily supply power when the power demand exceeds the power available at the input 13 and stores energy when the power available at the input 13 is sufficient. The preferred storage element 17 consists of capacitive elements or capacitors. However, storage element 17 could consist of other elements such as batteries. The power supply 11 is also provided with power converters 21 and the load management system 19 of the present invention which manages the current demands on power supply 11 to prevent erratic behavior.

The input protection circuit and filter 15 guards the other components in the ONU 9 from high voltage and high current hazards resulting from high voltage and high current transients caused by events such as lightning strikes, power cross, and/or 60 Hz induction on the input wire pair. The input protection circuit and filter 15 disconnects the input power when a high voltage transient is sensed and limits the flow of current when a high current transient is sensed.

The power converters 21 are elements which convert the input voltage to the appropriate A.C. and D.C. voltages required by other circuitry within the ONU 9. In the embodiment illustrated, the power converters 21 include D.C. to D.C. converter 26, ringing generator converter 25, and talk battery converter 27. Each converter 21 is preferably provided with converter output capacitive elements 29 to assist in equalizing its D.C. output.

The load management system 19 of the present invention provides control signals 23 to either distinct circuits within the ONU 9 to signal those device to stop drawing current or to distinct converters 21 within the power supply 11 to signal those converters to turn off. In one embodiment, a separate control signal 23 is provided for each converter 21 to turn off a particular converter upon the setting of a particular control signal 23. In another embodiment, a separate control signal 23 is provided corresponding to each converter 21 but the control signals 23 are routed to particular circuits within the ONU 9 that draw power from the corresponding converter 21 to signal those circuits to turn off upon the setting of the particular control signals 23. In a third embodiment, the control signals 23 do not correspond to specific power converters but are arranged to turn off different combinations of circuits within the ONU 9. In this description, the first case will be discussed, however, this invention is capable of being carried out using any of the above mentioned embodiments or other combinations without departing from the spirit of the invention.

The converters 21 draw power from the input 13 according to the power needs of the respective load elements or circuits within the ONU 9 that are powered by the particular converter 21. When the input voltage is low, the converters 21 draw more current to supply the output load, and vice versa when the input voltage is high. Thus, the converters 21 present a negative impedance to the input 13.

The power supply 11 will begin to behave erratically when the load voltage drops below 70 volts. To protect the ONU 9 from erratic behavior, the power supply 11 will shut down when the load voltage drops below 65 volts. After the power supply has shut down, it will not recover until the load is removed. This causes ONU 9 to completely shut down and cease delivering telecommunication services to customers.

Shut down of the power supply is accomplished by resetting a PWR_UP control signal 24 which causes all of the main converters 21 to shut down thus removing the load from power supply 11. The converters 21 will not restart again until the PWR_UP control signal 24 is set. The PWR_UP control signal 24 is set when the output voltage Vcap at storage element 17 is charged back up to a power-up threshold, preferably 100 volts.

Figure 2:
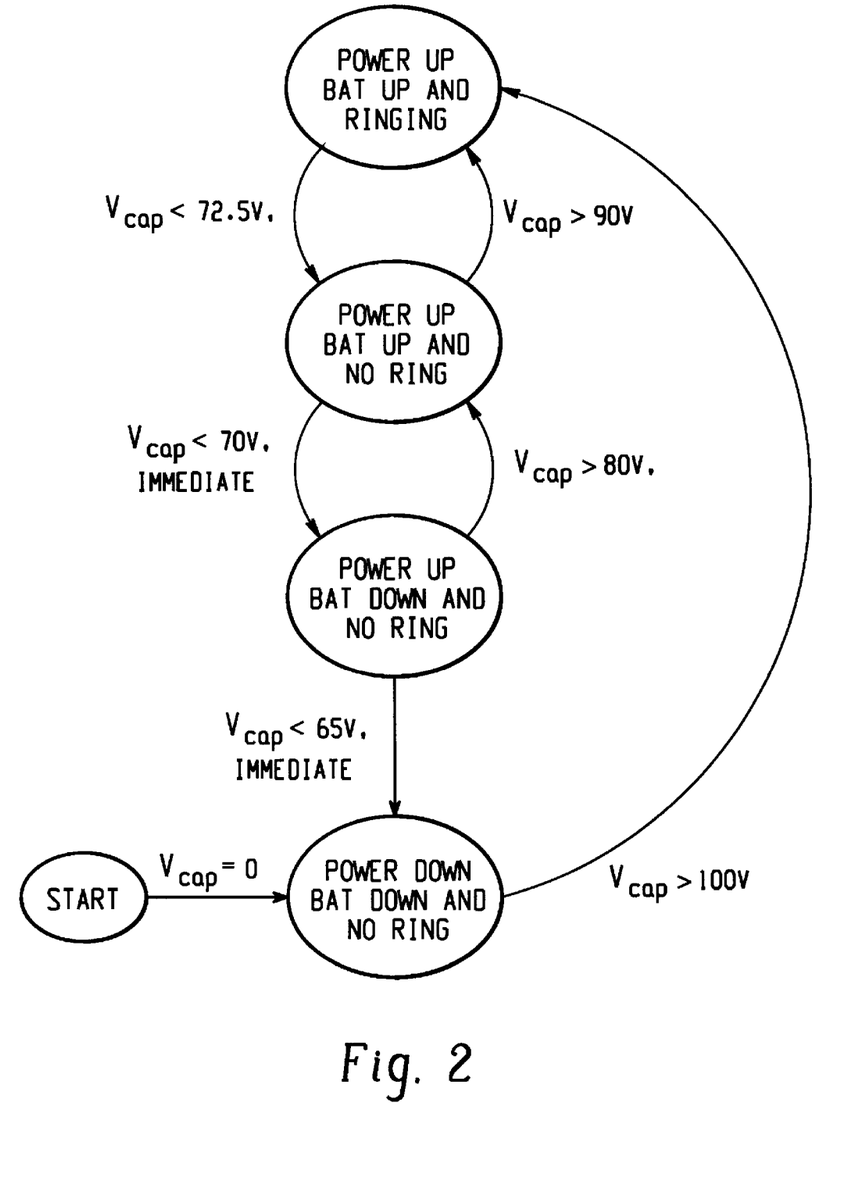
FIG. 2 is a state diagram demonstrating a particular application of the invention.

FIG. 2 sets forth a state diagram which describes the functioning of a preferred embodiment of the load management system 19 according to the present invention. During initial power up and subsequent unusual heavy power drain conditions, more power is needed than what the power supply 11 can supply. Storage element 17 and stepped load management 19 are used to prevent system lock down. During heavy power drain conditions, storage element 17 supplies stored energy for use within the ONU 9. While providing power, the stored energy within storage element 17 is reduced resulting in a lower output voltage Vcap provided by storage element 17. If an unusually heavy power drain condition occurs and lasts for an extended period, storage element 17 will be drained to an unacceptable level causing the voltage supplied to the converters 21 to be too low. To prevent damage to the power supply 11 and other circuitry within the ONU 9, the load management system 19 starts shedding load in an ordered sequence to allow the storage elements 17 to recharge. The voltage across storage element 17 is monitored and detection thresholds are set.

Prior to power-up, all converter output capacitors 29 were initially discharged. During the start-up process, a substantial amount of energy is needed just to bring these capacitive elements 29 up to their operating voltages. Much of this initial charging energy is supplied from the stored energy in the storage capacitors 17. To prevent unstable operation at power-up, power should not be applied to the main converters 21 until there is sufficient energy stored in the storage capacitors 17. This is accomplished by setting a power-up threshold, 100 volts in the preferred embodiment. When the output voltage Vcap of storage capacitor 17 reaches the power-up threshold, the PWR-UP control signal is set. Each converter 21 then powers up, preferably after a timed delay. The timing delay of the main converters 21 are preferably staggered so the start-ups do not present a concentrated surge load on the stored energy in the storage capacitors 17.

Telephones that are connected to the ONU 9 are supplied with ringing power from the ONU 9 and, in particular, substantially from the energy stored in the storage capacitors 17. As the telephones begin to ring, the output voltage Vcap from storage capacitors 17 will ramp down. If the output voltage Vcap goes below 70 volts, there is the danger of erratic operation. To prevent erratic operation, a voltage threshold is set at 72.5 volts. Whenever the output voltage Vcap falls below 72.5 volts, a NO_RING_PCOM control signal is set. This causes the ringing generator converter 25 to shut down. A ringing cycle may be cut short, but the system is saved from going into an erratic behavior state. This also give the storage capacitors 17 the time to recharge before the next ringing cycle. A storage capacitor 17 voltage threshold is set, preferably at 90 volt, for the ringing generator converter 25 to restart. When the output voltage Vcap goes above the 90 volt threshold, the NO_RING_PCOM control signal will be reset. This causes the ringing generator converter 25 to restart, preferably after a two second delay.

Although statistically improbable, it is possible that all telephones connected to the ONU 9 can come off-hook at the same time. When this happens, more power is drawn than what is available. The stored energy in the storage capacitor 17 will supply the excess power until the output voltage Vcap ramps down to about 70 volts. To prevent erratic behavior, a voltage threshold is set preferably at 70 volts. Whenever the output voltage Vcap falls below the 70 volt threshold, a BAT_UP control signal is reset. This control signal causes the −23 v/−46 v talk battery converter 27 to shut down. This disables all channels in the ONU 9, but it saves the system from erratic operation. This also give the storage capacitors 17 the time to recharge. An output voltage Vcap threshold is set at, preferably 80 volts, for the −23 v/−46 v converter 27 to restart. When the output voltage Vcap rises above the 80 volt threshold, the BAT_UP control signal will be set. This causes the −23 v/−46 v converter 27 to restart, preferably after a 5 second time delay.

Figure 3A:
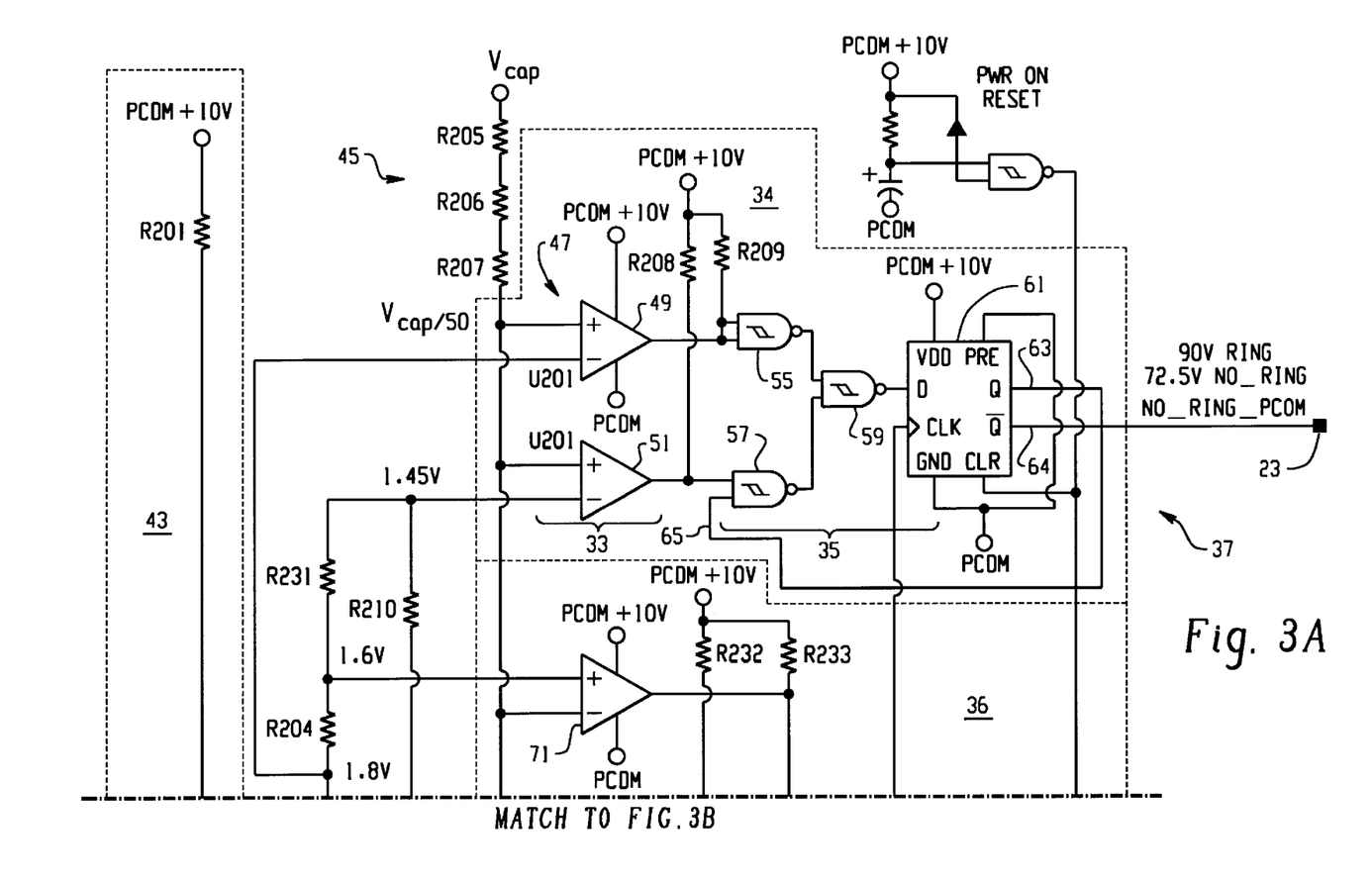
FIG. 3 is a circuit diagram of a preferred implementation of the state diagram of FIG. 2.
Figure 3B:
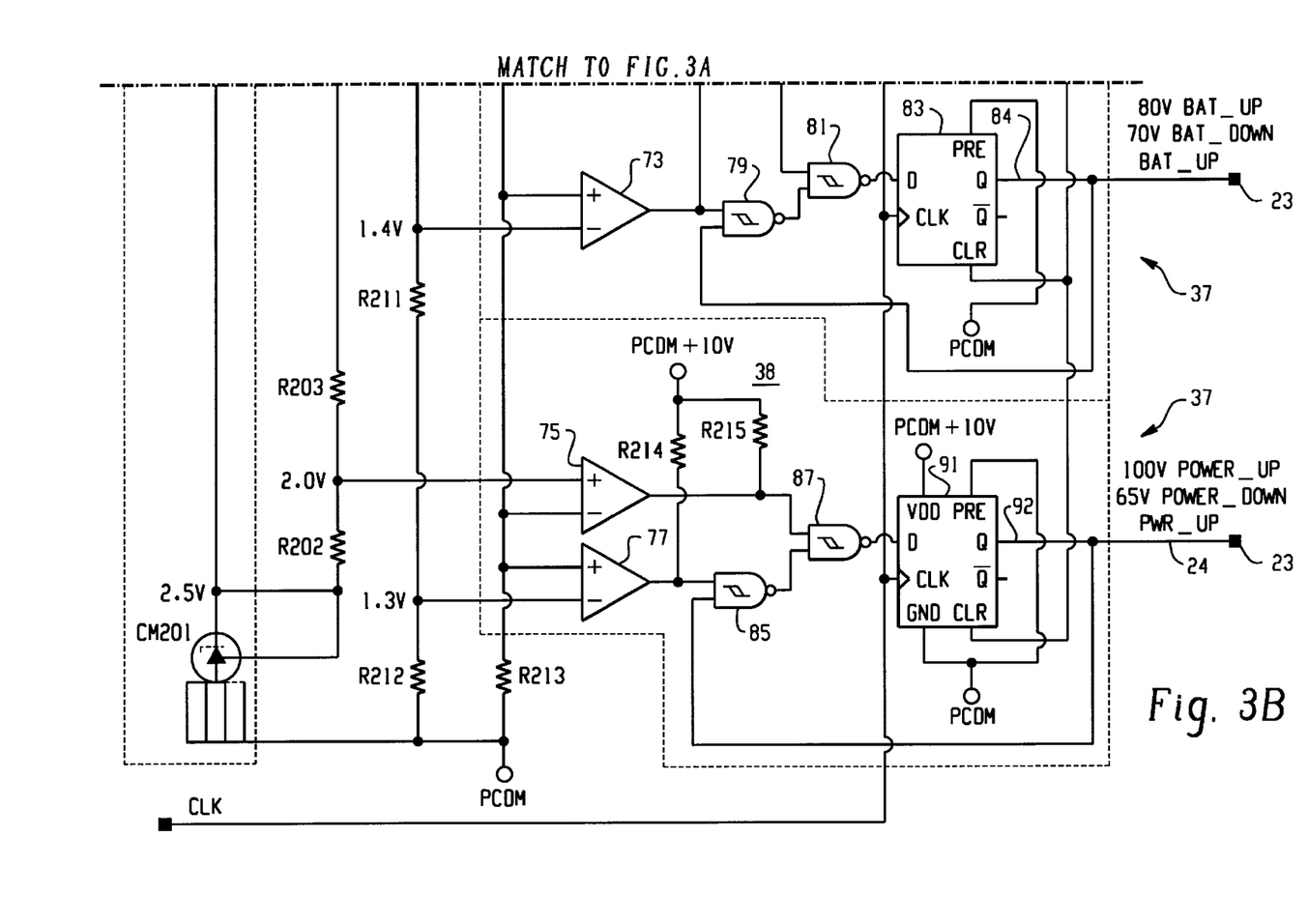

FIG. 3 sets forth a preferred implementation of the state diagram of the present invention. Three sets of hysteresis circuits 37, each implementing one up-transition and one down-transition are used to manage all the state transitions of FIG. 2. The hysteresis circuits 37 of FIG. 3 consist of two main type of circuits, the state sensing circuits 33 and the state transition circuits 35. The state sensing circuits 33 sense when the output voltage Vcap has reached a level requiring a state transition and the state transition circuits 35 set or reset the control signals 23 to the appropriate state to signal the appropriate converters 21 to switch to the proper state, the power up or power down state.

The inputs to the state sensing circuits 33 are provided by voltage reference elements 43 and voltage divider elements 45. In the embodiment shown, voltage reference elements 43 consists of 6 distinct voltage references for use at inputs to state sensing circuits 33. Resistor R201 and voltage reference CR203 provide a low impedance precision 2.5 volt voltage reference at pin 1 of voltage reference CR203. This 2.5 volt voltage reference is divided down by the resistor string R202, R203, R204, R231, R210, R211 and R212 to provide 6 different voltage references. The preferred voltage reference values are 2.00 volts, 1.80 volts, 1.60 volts, 1.45 volts, 1.40 volts, and 1.30 volts. These voltage levels correspond to the six different threshold voltage levels defined by the state transition diagram of FIG. 2 divided by a factor of 50.

Voltage divider element 45 in the embodiment illustrated consists of a resistor string made up of resistive elements R205–R207 and R213. Voltage divider element 45 divides the output voltage Vcap by a factor of 50 and presents this voltage at inputs to each of the sensing circuits 33. In the embodiment illustrated, sensing circuits 33 comprise comparators 47. The comparators 47 compare the voltage provided by voltage divider element 45 with the respective voltages provided by voltage reference 43 and outputs an indication as to whether output voltage Vcap is higher or lower than the threshold voltage for that comparator 47.

The up and down transitions between the "power-up/bat-up/ringing" (PUBUR) state and the "power-up/bat-up/no ring" (PUBUNR) state is implemented by the "ring/no-ring" hysteresis circuit 34. In the "ring/no-ring" hysteresis circuit 34, the first comparator 49 outputs a high signal when the output voltage Vcap is greater than 90 volts and the second comparator 51 outputs a high signal when the output voltage Vcap is greater than 72.5 volts The state transition circuit 35 in the "ring/no-ring" hysteresis circuit consists of three NAND gates 55, 57, and 59 and a flip-flop 61. The state transition circuit 35 implements the hysteresis function between the thresholds by using positive feedback from the flip-flop output 63 to the NAND gate input 65. The flip-flop output 64 resets control signal NO_RING_PCOM (low state) when the output voltage Vcap is greater than 90 volts. The flip-flop output 64 sets the control signal NO_RING_PCOM (high state) when output voltage Vcap falls below 72.5 volts. This causes the ringing generator 25 to shut down. Control signal NO_RING_PCOM will remain set (high) until output voltage Vcap rises above 90 volts. Control signal NO_RING_PCOM will then be reset (low) and allow ringing generator 25 to power back up.

The other two hysteresis circuits 36, 38 operate the same way implementing the remaining transition thresholds. In addition, an inverting NAND gate is eliminated in these circuits 36, 38 by reversing the polarity of the upper comparators 71, 75.

The "bat-up/bat-down" hysteresis circuit 36 consists of two comparators 71, 73, resistors R232, R233, two NAND gates 79, 81 and a flip-flop 83. The "bat-up" threshold is set at 80 volts and the "bat-down" threshold is set at 70 volts. The flip-flop output 84 sets the BAT_UP control signal 23 which in turn controls the powering state of the −23 v/−46 v converter 27.

The "power-up/power-down" hysteresis circuit 38 consists of two comparators 75, 77, resistors R214, R215, two NAND gates 85, 87 and a flip-flop 91. The "power-up" threshold is set at 100 volts and the "power-down" threshold is set at 65 volts. The flip-flop output 92 sets the PWR_UP control signal 23 which in turn controls the powering state of most of the converters 21.

Having described in detail the preferred embodiment of the present invention, including its preferred modes of operation, it is to be understood that this operation could be carried out with different elements and steps. For example, one of ordinary skill in the art could modify the state diagram of FIG. 2 to include any number of states or threshold levels. Also one of ordinary skill could implement the state diagram using other circuits, microprocessors, and/or software. This preferred embodiment is presented only by way of example and is not meant to limit the scope of the present invention which is defined by the following claims.

What is claimed:

1. An electronic apparatus comprising:
    a power supply for supplying power;
    an electronic load that draws current from the power supply, the load having at least a first load element, a second load element, and a third load element, the first load element being capable of operating independently of whether the second or third load element is operating, the second load element being capable of operating independently of whether the third load element is operating; and from the load management circuit for signaling to the first load element when it can draw current from the power supply, for signaling to the second load element when it can draw current from the power supply, and for signaling to the third load element when it can draw current from the power supply, the load management circuit comprising a first state transition circuit, a second state transition circuit, and a third state transition circuit, the first state transition circuit providing a first control signal, the first control signal indicating that the first load element can draw current when the voltage at an output of the power supply is above a first threshold level and indicating that the first load element should not draw current when the voltage at the output is below a second threshold level, the second state transition circuit providing a second control signal, the second control signal indicating that the second load element can draw current when the voltage at the output is above a third threshold level and indicating that the second load element should not draw current when the voltage at the output is below a fourth threshold level, the third state transition circuit providing a third control signal, the third control signal indicating that the third load element can draw current when the voltage at the output is above a fifth threshold level and indicating that the third load element should not draw current when the voltage at the output is below a threshold sixth level, and wherein the first threshold level is higher than the third threshold level, the third threshold level is higher than the fifth threshold level, the second threshold level is lower than the sixth threshold level, and the sixth threshold level is lower than the fourth threshold level.

2. The apparatus according to claim 1 further comprising:
a first state sensing circuit coupled to the first state transition circuit and to the output of the power supply, the first state sensing circuit being operable to indicate whether the voltage at the output has risen above the first threshold level, the first state sensing circuit also being operable to indicate whether the voltage at the output has fallen below the second threshold level;
a second state sensing circuit coupled to the second state transition circuit and to the output of the power supply, the second state sensing circuit being operable to indicate whether the voltage at the output has risen above the third threshold level, the second state sensing circuit also being operable to indicate whether the voltage at the output has fallen below the fourth threshold level; and
a third state sensing circuit coupled to the third state transition circuit and to the output of the power supply, the third state sensing circuit being operable to indicate whether the voltage at the output has risen above the fifth threshold level, the third state sensing circuit also being operable to indicate whether the voltage at the output has fallen below the sixth threshold level.

3. The apparatus according to claim 2 wherein each state sensing circuit comprises a pair of comparators.

4. The apparatus according to claim 3 further comprising a voltage reference circuit and a voltage divider circuit coupled to each state sensing circuit.

5. The apparatus according to claim 4 wherein each state transition circuit comprises a NAND gate and a flip-flop.

6. The apparatus according to claim 5 wherein the voltage divider circuit comprises a plurality of resistive elements.

7. The apparatus according to claim 6 wherein the voltage reference circuit comprises a diode and a plurality of resistive elements.

8. A load management system for an electronic device having a power supply and an electronic load that draws current from the power supply, the load having at least a first load element, a second load element, and a third load element, the first load element being capable of operating independently of whether the second or third load element is operating, the second load element being capable of operating independently of whether the third load element is operating, the load management system comprising:

a first state transition circuit for providing a first control signal, the first control signal indicating that the first load element can draw current when the voltage at an output of the power supply is above a first threshold level and indicating that the first load element should not draw current when the voltage at the output is below a second threshold level;

a second state transition circuit for providing a second control signal, the second control signal indicating that the second load element can draw current when the voltage at the output is above a third threshold level and indicating that the second load element should not draw current when the voltage at the output is below a fourth threshold level;

a third state transition circuit for providing a third control signal, the third control signal indicating that the third load element can draw current when the voltage at the output is above a fifth threshold level and indicating that the third load element should not draw current when the voltage at the output is below a threshold sixth level; and wherein the first threshold level is higher than the third threshold level, the third threshold level is higher than the fifth threshold level, the second threshold level is lower than the sixth threshold level, and the sixth threshold level is lower than the fourth threshold level.

9. The load management system according to claim 8 further comprising:
a first state sensing circuit coupled to the first state transition circuit and to the output of the power supply, the first state sensing circuit being operable to indicate whether the voltage at the output has risen above the first threshold level, the first state sensing circuit also being operable to indicate whether the voltage at the output has fallen below the second threshold level;
a second state sensing circuit coupled to the second state transition circuit and to the output of the power supply, the second state sensing circuit being operable to indicate whether the voltage at the output has risen above the third threshold level, the second state sensing circuit also being operable to indicate whether the voltage at the output has fallen below the fourth threshold level; and
a third state sensing circuit coupled to the third state transition circuit and to the output of the power supply, the third state sensing circuit being operable to indicate whether the voltage at the output has risen above the fifth threshold level, the third state sensing circuit also being operable to indicate whether the voltage at the output has fallen below the sixth threshold level.

10. The system according to claim 9 wherein each state sensing circuit comprises a pair of comparators.

11. The system according to claim 10 further comprising a voltage reference circuit and a voltage divider circuit coupled to each state sensing circuit.

12. The system according to claim 11 wherein each state transition circuit comprises a NAND gate and a flip-flop.

13. The system according to claim 12 wherein the voltage divider circuit comprises a plurality of resistive elements.

14. The system according to claim 13 wherein the voltage reference circuit comprises a diode and a plurality of resistive elements.

15. A load management system for an electronic device having a power supply and an electronic load that draws current from the power supply, the load having at least a first load element and a second load element, the first load element being capable of operating independently of whether the second load element is operating, the load management system comprising:

a first state transition circuit for providing a first control signal, the first control signal indicating that the first load element can draw current when the voltage at the output is above a first threshold level and indicating that the first load element should not draw current when the voltage at the output is below a second threshold level;

a second state transition circuit for providing a second control signal, the second control signal indicating that the second load element can draw current when the voltage at the output is above a third threshold level and indicating that the second load element should not draw current when the voltage at the output is below a fourth threshold level;

a first state sensing circuit coupled to the first state transition circuit and to the output of the power supply, the first state sensing circuit being operable to indicate whether the voltage at the output has risen above the first threshold level, the first state sensing circuit also being operable to indicate whether the voltage at the output has fallen below the second threshold level; and a second state sensing circuit coupled to the second state transition circuit and to the output of the power supply, the second state sensing circuit being operable to indicate whether the voltage at the output has risen above the third threshold level, the second state sensing circuit also being operable to indicate whether the voltage at the output has fallen below the fourth threshold level, wherein the first threshold level being higher than the third threshold level and the second threshold level being lower than the fourth threshold level.

* * * * *

UNITED STATES PATENT AND TRADEMARK OFFICE
CERTIFICATE OF CORRECTION

PATENT NO.    : 6,608,900 B1                                        Page 1 of 1
DATED         : August 19, 2003
INVENTOR(S)   : Yancey et al.

It is certified that error appears in the above-identified patent and that said Letters Patent is hereby corrected as shown below:

<u>Column 7,</u>
Line 3, change "from the" to -- a --

Signed and Sealed this

Thirteenth Day of April, 2004

JON W. DUDAS
*Acting Director of the United States Patent and Trademark Office*